Feb. 6, 1951          L. H. METZGER          2,540,793
ROTARY SAW
Filed April 21, 1950
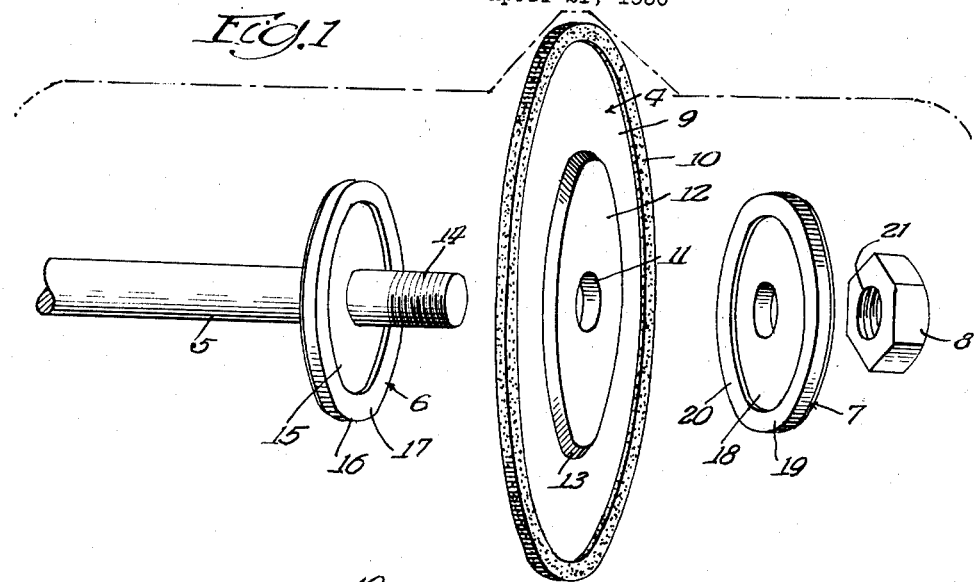
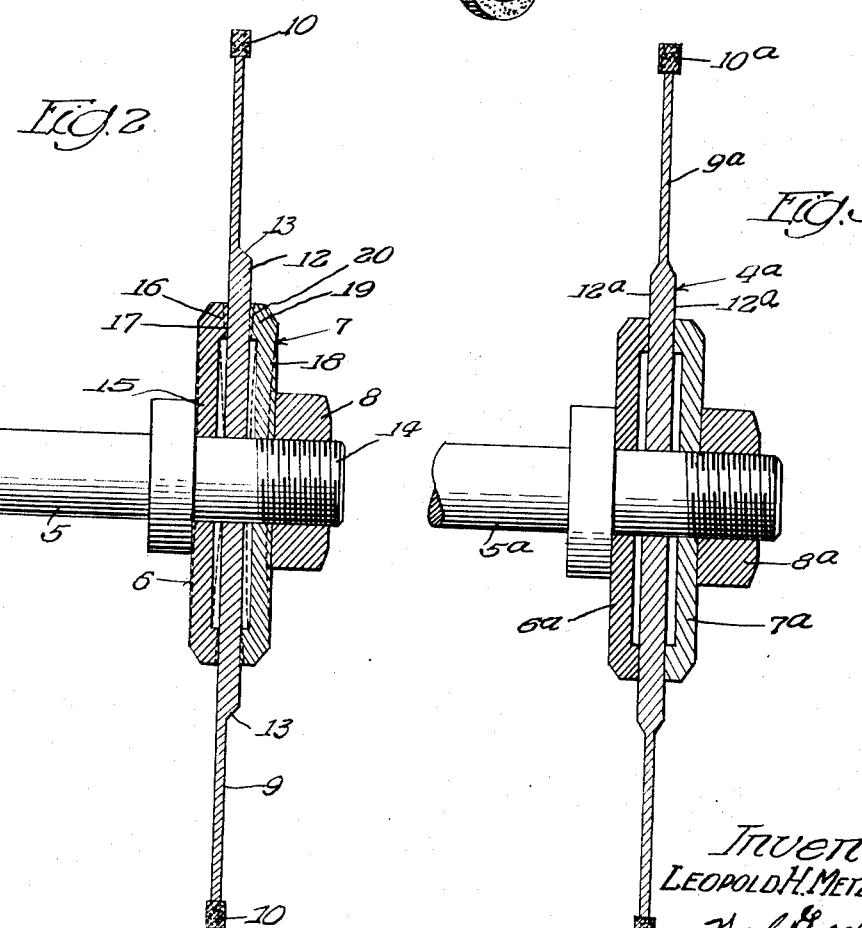
Inventor
LEOPOLD H. METZGER
By Fred Gerlach
Atty.

Patented Feb. 6, 1951

2,540,793

UNITED STATES PATENT OFFICE 2,540,793

ROTARY SAW

Leopold H. Metzger, Chicago, Ill., assignor to Super-Cut, Inc., Chicago, Ill., a corporation of Illinois Application April 21, 1950, Serial No. 157,375

4 Claims. (Cl. 125—15)

The present invention relates generally to rotary saws. More particularly the invention relates to that type of saw which serves as a medium or instrumentality for cutting relatively hard material, such as stone, marble or concrete, consists of a circular, centrally apertured metallic body and a cutting rim in the form of crushed or fragmented diamonds and a metallic matrix for the diamonds, and is adapted to be mounted concentrically on and rotated by a power driven shaft having as combined mounting and driving means for the saw a fixed collar at one side of the body of the saw, a loose collar at the other side of the saw body and a nut for urging the loose collar towards the fixed collar in order to effect clamping of the inner portion of the body of the saw between the two collars.

In a rotary saw of this type it has heretofore been conventional to make the body comparatively thin and of uniform thickness throughout and to proportion and shape the cutting rim so that the side portions thereof project laterally beyond the sides of the saw body and have flat side surfaces. It has also been conventional or standard practice to employ on the drive shaft for the saw comparatively large cup shaped collars consisting of circular, centrally apertured body members and annular flanges which are connected to, and extend inwards from, the outer margins of the body members and have flat side surfaces for engaging the adjacent portions of the sides of the saw body. The purpose of employing or utilizing cup shaped collars of the aforementioned character is to cause the body of the saw to be gripped by the annular flanges at a zone or location outwards of the aperture. If the collars, instead of being cup shaped, had flat inner surfaces in engagement with the sides of the saw body the body of the saw would be clamped between the inner marginal portions of the collars that are subjected to the direct clamping pressure of the nut after tightening of the nut. In practice it has been found that utilization of comparatively large cup shaped collars and a small sized nut as the combined mounting and driving means for a conventional saw, the body of which is comparatively thin and of uniform thickness throughout, is subject to a major objection with respect to both performance and life of the saw. The objection is due to the fact that when the nut on the drive shaft for the saw is tightened sufficiently to cause the proper clamping of the intermediate portion of the saw body between the inwardly extending flanges of the collars the body member of the loose collar as well as that of the fixed collar is caused to bow or flex inwards and thus assume a concavo-convex shape. Inward bowing or flexing of the body members of the collars results in the inwardly extending annular flanges spreading outwards to such an extent that the major portions of the side surfaces of the flanges tilt away from the contiguous portions of the sides of the saw body and result in such contiguous portions being gripped only by the inner edges of the side surfaces of the flanges. In connection with outward spreading of the flanges of the two collars due to tightening of the nut the portion of the saw body that is inwards of the inwardly extending annular flanges of the collars is subjected to such strain and distortion that the outer portion of the saw body, i. e., the portion between the flanges and the cutting rim, is caused to assume a dished shape. When the outer portion of the saw body is of such shape the cutting rim assumes such an irregular angular position with respect to the material being cut that it not only cuts improperly but also wears at an extremely rapid rate. In addition, the saw body, due to the fact that the dished shape thereof is not uniform, tends to set up objectionable and deleterious vibration.

The principal object of this invention is the provision of a saw which is so constructed and designed that it is not subject to the objection heretofore mentioned. Generally speaking, the saw is conventional or standard except for the fact that the inner portion of the body, i. e., the portion that extends outwards from the central aperture either to or directly beyond the zone that is gripped and clamped between the side surfaces of the annular flanges of the collars, is provided with an integral enlargement which is of such thickness that it is not subject to distortion in the event that the body members of the loose and fixed collars are subjeced to inward bowing or flexing in response to tightening of the nut on the drive shaft. By preventing any distortion of the inner portion of the saw body there is no likelihood of the outer portion, i. e., the portion outwards of the collars, becoming warped or dished and hence the cutting rim in the form of crushed or fragmented diamonds and a metallic matrix therefor remains at all times in its proper angular position and cuts efficiently and without undue wear.

Another object of the invention is the provision of a rotary saw of the last mentioned type and character in which the integral enlargement on the inner portion of the body is of uniform thickness throughout.

A further object of the invention is to provide a rotary saw which is generally of new and improved construction and is characterized by extremely high efficiency and length of life.

Other objects of the invention and the various advantages and characteristics of the present rotary saw will be apparent from a consideration of the following detailed description.

The invention consists in the several novel features which are hereinafter set forth and are more particularly defined by claims at the conclusion hereof.

In the drawing which accompanies and forms a part of this specification or disclosure and in while like numerals of reference denote corresponding parts throughout the several views:

Figure 1 is a perspective showing a rotary saw embodying one form of the invention in spread or spaced apart relation with a drive shaft, a fixed cup shaped collar on the drive shaft, a loose cup shaped collar and a clamp nut;

Figure 2 is an enlarged axial section showing the parts of Figure 1 in assembled or operative relation; and Figure 3 is a similar section of a saw embodying another or modified form of the invention in assembled relation with a drive shaft and combined saw mounting and driving means in the form of a fixed collar, a loose collar and a nut.

The saw which is shown in Figures 1 and 2 constitutes one form or embodiment of the invention and is designated by the reference numeral 4. It is illustrated in connection with a drive shaft 5, a fixed collar 6, a loose collar 7 and a nut 8 and when mounted or arranged in operative relation with such parts as hereinafter described, forms a unitary assembly for cutting relatively hard material such, for example, as stone, marble or concrete.

The saw 4 comprises a circular body 9 and a cutting rim 10. The body is formed of steel or any other suitable metal and has a central aperture 11 for receiving the shaft 5. The aperture 11 is circular and closely approximates in diameter the shaft. The outer portion of the saw body 9 is comparatively thin and, as shown in Figure 2, is of uniform thickness throughout. One side of the inner portion of the body of the saw is flush with, and forms a continuation of, the corresponding side of the outer portion of the saw body, and the other side of the inner portion of the saw body is provided with an integral enlargement 12. The latter is of uniform thickness throughout and has a truly flat outer side surface which is laterally offset with respect to the corresponding side of the outer portion of the body of the saw. The purpose of the enlargement 12 will be defined in detail hereafter. As shown in Figure 1, the enlargement 12 is circular and extends to the central shaft-receiving aperture 11. The outer peripheral portion of the enlargement is preferably beveled at an angle of approximately 45° in order that there is a fillet 13 between the outer peripheral portion of the enlargement and the contiguous or adjoining side of the outer portion of the body of the saw. The outer periphery of the saw body is preferably cylindrical and forms a seat for the cutting rim 10. The latter is in the form of crushed or fragmented diamonds and a metallic matrix and is soldered or otherwise fixedly secured to the cylindrical outer periphery of the saw body 9. As best shown in Figure 2, the cutting rim 10 is rectangular in cross section and is so proportioned that its side portions project laterally beyond the sides of the outer portion of the saw body and have flat parallel surfaces. The matrix part of the cutting rim is preferably in the form of sintered metal powder. The cutting rim may be continuous as shown in the drawing or in the form of segments which are either bonded to the outer periphery of the saw body or mounted in spaced apart notches (not shown) in the outer marginal portion of the saw body. In connection with use of the saw the rim 10 in the form of crushed or fragmented diamonds and the metallic matrix effects the desired cutting.

The shaft 5, the collars 6 and 7 and the nut 8 together constitute a mounting and driving instrumentality for the saw 4. The shaft 5 is provided at one end thereof with a male screw thread 14 for the nut 8. The other end of the shaft is connected to a motor or other suitable power source (not shown) for drive thereby. The fixed collar 6 is mounted on, and extends around, the shaft 5 at a point inwards of the male screw thread 14. It is cup shaped and consists of a circular centrally apertured body member 15 and an integral annular flange 16. The flange is formed integrally with the outer marginal portion of the body member 15, projects in the direction of the screw threaded end of the shaft 5 and has a flat side surface 17. The portion of the body member 15 that defines the central aperture in the collar 6 abuts against a small sized enlargement on the shaft 5 and is connected to the shaft 5 by a so-called press fit in order that said collar is in fixed relation with the shaft. If desired, however, such portion may also be connected to the shaft by way of a key. The loose collar 7 is positioned on the shaft 5 in opposed relation with the fixed collar 6 and in response to tightening of the nut 8 serves to clamp the inner portion of the saw body 9 against the flat side surface 17 on the flange 16. It is the same in size and construction as the fixed collar and consists of a circular centrally apertured body member 18 and an annular flange 19. The diameter of the aperture in the central portion of the body member 18 is but slightly larger than the diameter of the shaft 5 in order that the collar 7 may be slid readily onto and off the screw threaded end of the shaft. The annular flange 19 is formed integrally with the outer marginal portion of the body member 18, projects in the direction of the flange 16 and has a flat side surface 20. The two collars 6 and 7 are of no greater external diameter than the integral enlargement 12 on the inner portion of the saw body 9 and are formed of steel, cast iron or any other suitable material. The nut 8 has an internal or female screw thread 21 for connection with the male screw thread 14 on the shaft 5 and is materially smaller than either of the two collars. It is adapted to engage the inner portion of the body member 18 of the loose collar 7 as shown in Figure 2 and serves when tightened to urge the loose collar towards the fixed collar 6 in order to effect clamping of the intermediate portion of the body of the saw 4 between the two collars. The inner end surface of the nut is flat in order to engage flatly against the outer surface of the inner portion of the body member 18 of the loose collar 7. Because of the cup shaped character of the loose two collars the nut 8 tends, when tightened to the proper extent to effect the desired clamping of the intermediate portion of the saw body between the two collars, to bow or flex inwards the body members of the collars as shown by dotted lines in Figure 2. In connection with inward bowing or flexing of the body members of the two collars the flat side surfaces 17 and 20 of the flanges 16 and 19 tilts away from the body of the saw to such an extent that the saw body is gripped mainly by the inner edges of the flat side surfaces 17 and 20. The integral enlargement 12 serves so to increase the thickness of the inner portion of the saw body 9 that said inner portion is so rigid that it is not in any way distorted when the nut 8 is tightened sufficiently to cause inward bowing or flexing of the body members of the collars 6 and 7. By reason of the fact that the integral enlargement 12 reenforces the inner portion of the saw body against distortion there is no tendency whatsoever of the outer portion of the body of the saw to become dished or warped and hence the cutting rim 10 always maintains its proper angular position and effects the desired cutting without undue wear. In practice it has been found that if the integral enlargement 12 is of such thickness that it increases the over-all thickness of the inner portion of the body to no less than twice the thickness of the outer portion of the saw body desirable results are obtained. It is, however, contemplated that the integral enlargement 12 will make the over-all thickness of the inner portion of the saw body of such rigidity or strength that it will not be distorted when the nut 8 is so tightened as to cause inward bowing or flexing of the body members 15 and 18 of the collars 6 and 7.

In mounting the saw 4 the nut 8 and the loose collar 7 are first removed from the shaft 5. Thereafter the aperture 11 in the center of the body 9 of the saw is aligned with the threaded end of the shaft and the saw is shifted axially into abutment with the flat side surface 17 on the annular flange 16 of the fixed collar 6. Preferably the saw is positioned so that the truly flat side of the body faces the fixed collar. After manipulating the saw into place the loose collar 7 is slid onto the screw threaded end of the shaft until the flat side surface 20 of its annular flange 19 abuts against the outer portion of the integral enlargement 12 on the central portion of the body of the saw. Thereafter the nut 8 is mounted in place and then tightened to the proper extent to bring the saw body into a firm clamped position between the inwardly extending flanges of the two collars. Due to the fact that the inner portion of the saw body 9 includes the integral enlargement 12 the outer portion of the saw body remains at all times in a truly flat condition regardless of how tightly the nut 8 is applied.

The saw 4, due to the fact that it includes the integral enlargement 12, effectively and efficiently fulfills its intended purpose and its characterized by the fact that there can be no such distortion of the inner portion of its body as to cause warping or cupping of the thinner outer portion of the body. By employing the enlargement 12 it is possible, especially in connection with a large sized saw, to make the body of inexpensive low carbon steel instead of costly high carbon steel which is more difficult to machine.

The saw of Figure 3 is designated by the reference numeral 4a and is illustrated in connection with a drive shaft 5a, a fixed cup shaped collar 6a, a loose cup shaped collar 7a and a clamp nut 8a. It consists of a circular centrally apertured body 9a and a cutting rim 10a and is the same in construction and design as the saw 4 except that instead of having a single integral enlargement on the inner portion of its body it has two integral enlargements 12a. The latter are formed on opposite sides of the inner portion of the saw body 9a and each is one-half as thick as the single enlargement 12 of the saw 4. As shown in Figure 3 of the drawing the external diameter of the complemental cup shaped collars 6a and 7a is no greater than the external diameter of the enlargements 12a. Such enlargements serve so to increase the over-all thickness of the inner portion of the body 9a that such portion is sufficiently rigid to resist distortion in the event that the nut 8a on the shaft 5a is tightened sufficiently to cause the body member of the loose collar 7a to bow or flex inwards. The saw 4a, due to the fact that it includes the two integral enlargements 12a, has the same advantages and characteristics as the saw 4 which is illustrated in Figures 1 and 2 of the drawing.

The invention is not to be understood as restricted to the details set forth since these may be modified within the scope of the appended claims without departing from the spirit and scope of the invention.

Having thus described the invention what I claim as new and desire to secure by Letters Patent is:

1. In combination with a drive shaft having mounted thereon a pair of large sized spaced apart complemental cup-shaped oppositely facing collars in the form of centrally apertured disc-like body members and integral annular flanges connected to and extending inwardly from the outer margins of the body members and provided with flat opposed inwardly facing radially extending clamping surfaces, and also having mounted thereon a small sized clamp nut disposed directly outwards of the central portion of the body member of one of the collars and adapted when tightened to urge said one collar towards the other collar, a rotary saw mounted concentrically on the drive shaft between the two collars and comprising a solid circular one-piece metallic body proportioned so that it is of materially greater external diameter than said collars, embodying a centrally located circular aperture directly around the shaft, and having an annular intermediate zone thereof in direct contact with the radially extending clamping surfaces of the inwardly extending flanges of the collars, and a cutting rim extending around and connected fixedly to and of greater width than the outer margin of the body, having flat parallel sides outwards of said outer margin, and consisting of abrasive particles and a matrix therefor, the outer portion of the saw body from an imaginary circular concentric line around said intermediate zone outwards to the cutting rim being relatively thin and having substantially flat and parallel side faces, the remaining portion of the body including said intermediate zone being thickened uniformly throughout its whole area so that it is no less than twice as thick as said outer portion and is of such rigid character that, in the event of spreading and outward tilting of the flanges of the collars as the result of inward bowing or flexure of the collar body members due to pronounced tightening of the clamp nut, it effectively resists such distortion as to cause warping or bending of said outer portion of the saw body.

2. In combination with a drive shaft having mounted thereon a pair of large sized spaced apart complemental cup-shaped oppositely facing collars in the form of centrally apertured disc-like body members and integral annular flanges connected to and extending inwardly from the outer margins of the body members and provided with flat opposed inwardly facing radially extending clamping surfaces, and also having mounted thereon a small sized clamp nut disposed directly outwards of the central portion of the body member one of the collars and adapted when tightened to urge said one collar towards the other collar, a rotary saw mounted concentrically on the drive shaft between the collars and comprising a solid circular one-piece metallic body proportioned so that it is of materially greater external diameter than said collars, embodying a centrally located circular aperture directly around the shaft, and having an intermediate zone thereof in direct contact with the radially extending clamping surfaces of the inwardly extending flanges of the collars, and a cutting rim extending around and connected fixedly to and of greater width than the outer margin of the body, having flat parallel sides outwards of said outer margin and consisting of diamond particles and a matrix therefor, the outer portion of the saw body from an imaginary circular concentric line around said intermediate zone outwards to the rim being relatively thin and having substantially flat parallel side faces, the remaining portion of said saw body including said intermediate zone being provided at one side thereof only with an integral laterally extending enlargement which is of uniform thickness throughout, is of no less thickness than said outer portion of the saw body, and serves so to increase the over-all thickness of said remaining portion that, in the event of spreading and outward tilting of the flanges of the collars as the result of inward bowing or flexure of the collar body members due to pronounced tightening of the clamp nut, said remaining portion effectively resists such distortion as to cause warping or bending of said outer portion of the saw body.

3. In combination with a drive shaft having mounted thereon a pair of large sized spaced apart complemental cup-shaped oppositely facing collars in the form of centrally apertured disc-like body members and integral annular flanges connected to and extending inwardly from the outer margins of the body members and provided with flat opposed inwardly facing radially extending clamping surfaces, and also having mounted thereon a small sized clamp nut disposed directly outwards of the central portion of the body member of one of the collars and adapted when tightened to urge said one collar towards the other collar, a rotary saw mounted concentrically on the drive shaft between the collars and comprising a solid circular one-piece metallic body proportioned so that it is of materially greater external diameter than said collars, embodying a centrally located circular aperture directly around the shaft, and having an annular intermediate zone thereof in direct contact with the radially extending clamping surfaces of the inwardly extending flanges of the collars, and a cutting rim extending around and connected fixedly to and of greater width than the outer margin of the body, having flat parallel sides outwards of said outer margin and consisting of diamond particles and a matrix therefor, the outer portion of the saw body from an imaginary circular concentric line around said intermediate zone outwards to the rim being relatively thin and having substantially flat and parallel side faces, the remaining portion of said saw body including said intermediate zone being provided at both sides thereof with integral laterally extending enlargements which are of uniform thickness throughout, are of no less combined thickness than the thickness of said outer portion of the saw body, and serve so to increase the over-all thickness of said remaining portion that, in the event of spreading and outward tilting of the flanges of the collars as the result of inward bowing or flexure of the collar body members due to pronounced tightening of the clamp nut, said remaining portion effectively resists such distortion as to cause warping or bending of said outer portion of the saw body.

4. As a new article of manufacture, a rotary saw designed to cut relatively hard material, such as stone, marble or concrete, adapted to be mounted concentrically on a drive shaft between a pair of large sized spaced apart complemental cup-shaped oppositely facing clamping collars in the form of centrally apertured disc-like body members and integral annular flanges connected to and extending inwards from the outer margins of the body members and provided with flat opposed inwardly facing radially extending clamping surfaces, said saw comprising a solid circular one-piece metallic body having materially greater external diameter than the collars, embodying a shaft-receiving aperture in the center thereof, and adapted to have the sides thereof gripped by the radially extending clamping surfaces of the flanges of the collars about a zone substantially midway between the aperture therein and its outer periphery, and a cutting rim extending around and connected fixedly to and of greater width than the outer margin of the body, having flat parallel sides outwards of said outer margin and consisting of a matrix and diamond particles distributed uniformly throughout the matrix, the outer portion of the saw body from an imaginary circular concentric line around said zone outwards to the cutting rim being relatively thin and having substantially flat parallel side faces, the remaining portion of the body including said zone being thickened uniformly throughout its whole area so that it is no less than twice as thick as said outer portion and is of such rigid character that, in the event of spreading or outward tilting of the flanges of the collars as the result of inward bowing or flexure of the collar body members due to the application of an inward clamping force to the central portions of said collar body members, it effectively resists such distortion as to cause warping or bending of said outer portion of the saw body.

LEOPOLD H. METZGER.

REFERENCES CITED

The following references are of record in the file of this patent:

UNITED STATES PATENTS

| Number | Name | Date |
| --- | --- | --- |
| Re. 21,165 | VanDerPyl | July 25, 1939 |
| 172,337 | Morrison | Jan. 18, 1876 |
| 1,063,380 | Pierce | June 3, 1913 |
| 1,374,334 | Simbling | Apr. 12, 1921 |
| 1,700,331 | Perks | Jan. 29, 1929 |
| 1,954,560 | Cunningham | Apr. 10, 1934 |
| 1,974,553 | Wilson | Sept. 25, 1934 |

FOREIGN PATENTS

| Number | Country | Date |
| --- | --- | --- |
| 753,829 | France | Oct. 25, 1933 |